United States Patent [19]
Stacik et al.

[11] Patent Number: 5,636,453
[45] Date of Patent: Jun. 10, 1997

[54] PLASTIC BEARING DRYER IDLER

[75] Inventors: Harold S. Stacik, St. Joseph; Steven J. Kuehl, Stevensville, both of Mich.

[73] Assignee: Whirlpool Corporation, Benton Harbor, Mich.

[21] Appl. No.: 420,805

[22] Filed: Apr. 12, 1995

[51] Int. Cl.$^6$ .................................. F26B 11/02
[52] U.S. Cl. ........................... 34/601; 34/602; 34/108
[58] Field of Search ..................... 34/108, 121, 601, 34/602

[56] References Cited

U.S. PATENT DOCUMENTS

| | | | |
|---|---|---|---|
| 3,636,786 | 1/1972 | Buck | 74/242 |
| 3,871,241 | 3/1975 | Pestka et al. | 74/242.11 |
| 3,947,076 | 3/1976 | Lindeman | 308/103 |
| 4,193,310 | 3/1980 | Boyer et al. | 74/230 |
| 4,300,293 | 11/1981 | Gladysz | |
| 4,392,753 | 7/1983 | Abel | 384/136 |
| 4,407,077 | 10/1983 | Smith | |
| 4,488,363 | 12/1984 | Jackson et al. | |
| 4,682,393 | 7/1987 | Corkery | |

*Primary Examiner*—Henry A. Bennett
*Assistant Examiner*—Dinnatia Doster
*Attorney, Agent, or Firm*—Hill, Steadman & Simpson

[57] ABSTRACT

An idler pulley assembly for tensioning a belt drive for a clothes dryer or other belt driven appliance. The idler pulley assembly provides a spring steel support anchored to a base of the clothes dryer, a Y-shaped bracket connected to the spring steel support and holding an idle pulley at an opposite end. The idle pulley is mounted on an open cross section, C-shaped shaft which is fixed at opposite arms of the Y-shaped bracket. An oil impregnated wick is inserted into the shaft which deposits oil on an inside surface of the idler pulley journaling the shaft.

21 Claims, 2 Drawing Sheets

5,636,453

PLASTIC BEARING DRYER IDLER

BACKGROUND OF INVENTION

The present invention relates to clothes dryers having a rotating drum for tumbling the clothes, and a belt drive system therefor. In particular, the present invention relates to a belt tensioning apparatus for maintaining an adequate belt tension between a drive pulley and the drum.

It is known to provide a dryer drum having a belt wrapped around the drum and wrapped around a drive pulley which is rotatably driven by an electric motor. It is also known to provide a idler pulley spring mounted to a dryer cabinet and resiliently urged against the belt to take up slack in the belt. Such an arrangement is generally described, for example, in U.S. Pat. Nos. 4,300,293 and 4,488,363.

With the known idler pulley assemblies, an effective and practical method of applying lubrication to the pulley during operation is not disclosed. Additionally, it is not provided in the known idler pulley assemblies to provide lateral guides to assist locating the belt onto the pulley during assembly.

SUMMARY OF THE INVENTION

It is an object of the present invention to provide an improved dryer idler pulley assembly. It is an object to provide such an assembly for a simplified and highly reliable belt system for a clothes dryer. It is an object to provide an efficient fabrication and assembly of a clothes dryer. It is an object to provide a long lasting, maintenance free drive assembly for the dryer.

The objects of the invention are achieved in that a dryer idler pulley assembly is provided having a pulley mounted on a rolled shaft which has a segment around its circumference open. The rolled shaft thus is approximately C-shaped and interfits within a journal area of the dryer idler pulley. An oil saturated wick is located within the rolled shaft extending through said open segment which places oil on a pulley bearing surface as its rotates around the shaft, and cleans the pulley bearing surface at the same time. The pulley itself has a sectionalized rim instead of a continuous rim which assists in the manufacturing process. The alternating sectioned rim on the plastic pulley allows single access pull in a mold used to form the pulley.

The assembly consists of a spring steel idler bracket having two arms spaced apart in parallel fashion, the bracket formed integrally with a V-shaped spring support tabbed into the dryer base, a high wear plastic pulley having a bearing surface incorporated into the pulley journal design, a rolled steel shaft polished to the required micron finish and snapped into the bracket, and an oil impregnated wick which provides continuous lubrication throughout the life of the complete idler assembly. The wick is preferably substantially triangular in cross section with an edge extending out of the shaft against the bearing surface. The shaft has C-shaped extensions at opposite ends to frictionally engage into D-shaped apertures formed into the two arms.

The idler shaft has substantially a C-shape, or a D-shape having a section of the straight stem of the "D" removed. The idler bracket arms each have an extension protruding inwardly toward each other. These extensions are located below the idler wheel. The length and placement of the extension prevents the belt from being mislocated to the shaft surface during the assembly operation. The idler bracket and the spring support are preferably stamp-formed from spring steel stock.

DETAILED DESCRIPTION OF THE PREFERRED EMBODIMENTS

Figure 1:
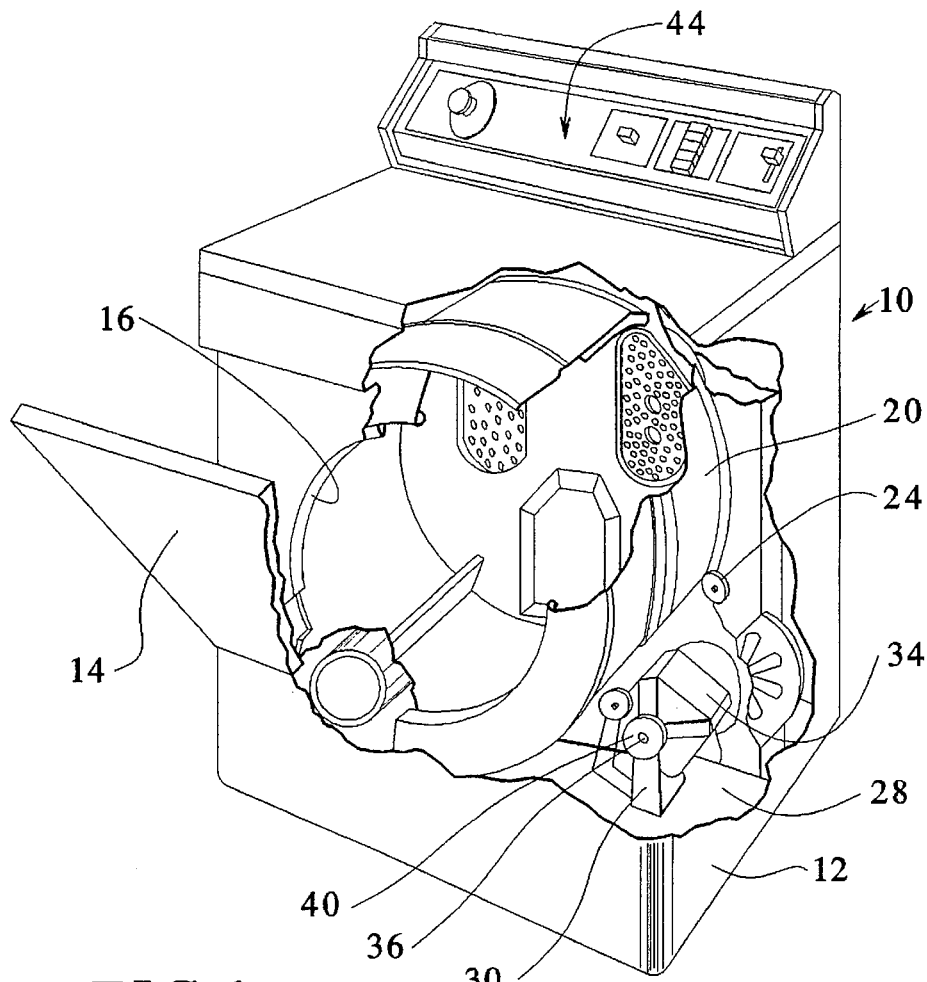
FIG. 1 is a perspective view of a clothes dryer incorporating the present invention, with portions removed for clarity.

FIG. 1 illustrates a clothes dryer 10 having external paneling 12 with a tiltable door 14 covering a clothes access opening 16 for placing wet clothes into a drum 20 for drying. The drum 20 is supported by a plurality of roller bearings 24 arranged below the horizontal axis of the dryer drum. Mounted to a floor or base 28 is a motor support 30 which supports an electric motor 34 having a horizontal drive shaft 36 holding a drive pulley 40. A control panel 44 is provided on a top side of the dryer which contains controls for temperature, speed, duration, etc. of the dryer operation.

Figure 2:
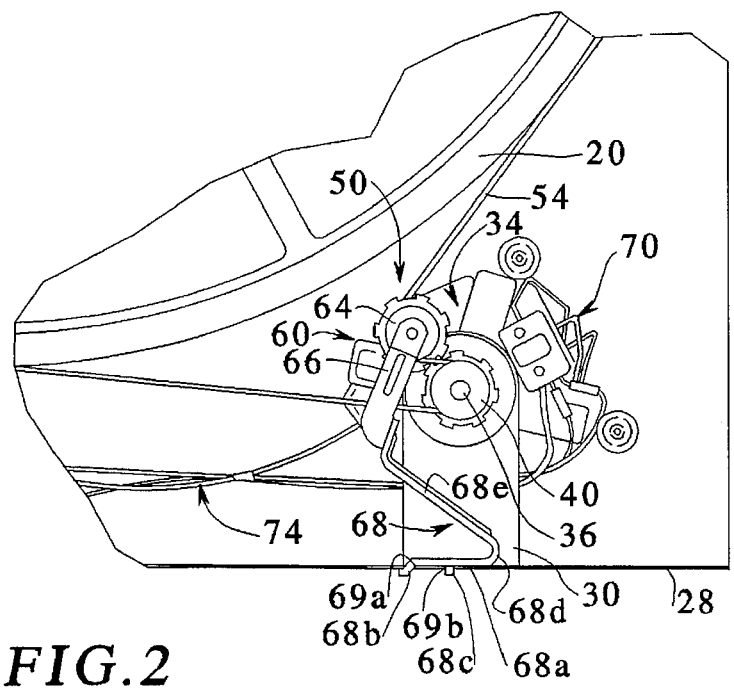
FIG. 2 is an enlarged partial perspective view of a belt drive system of the apparatus of FIG. 1.

FIG. 2 illustrates a belt drive system 50 of the present invention. The drive pulley 40 and the drum 20 are wrapped by a belt 54. An idler assembly 60 of the present invention presses against and thus tensions the belt 54. The assembly 60 comprises a idler pulley 64 mounted to rotate on an idler bracket 66 connected to, or formed integrally with, a spring support 68 which is connected to the base 28 of the dryer. Also shown in FIG. 2 is a wiring arrangement 70 including connectors and relays for the motor 34 as well as wiring 74 leading from the assembly 70 to the dryer control panel 44.

The spring support 68 provides a base portion 68a having an extending offset tab 68b at a distal end and a peg portion 68c in a central area. The extending offset tab 68b and the peg portion 68c engage into slots 69a,b in the dryer base. A base end 68d of the support 68 is connected to a lever portion 68e which extends upward to the bracket 66. The support 68 is designed having a thickness, bending resistance, and material selection to maintain its V-shape, between the lever portion 68e and the base portion 68a, and resiliently resist an opening up of the V-shape. By so doing, the support 68 provides the pressing force of the pulley 64 against the belt 54.

Figure 3:
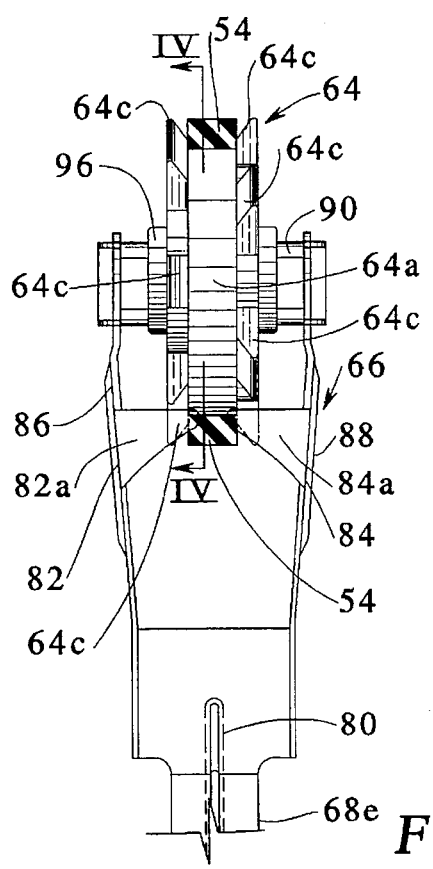
FIG. 3 is a partial elevational view of a idler pulley assembly as shown in FIG. 2.

FIG. 3 illustrates the bracket 66 extending downward into the lever 68e, the two components preferably integrally formed as a stamped spring steel part. The bracket 66 and the lever 68e provide a stamped raised portion or rib 80 to add rigidity at this location. The raised portion 80 extends from the bracket 66 downward on the lever 68e for substantially the entire length of the lever. Likewise the bracket 66 provides two arms 82, 84 having stamp-formed raised portions 86, 88 to add rigidity to these members.

Figure 5:
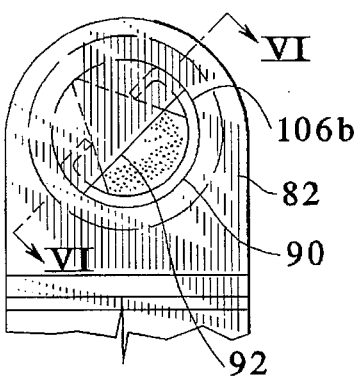
FIG. 5 is a partial side view of the assembly as shown in FIG. 3.

The two arms 82, 84 provide inwardly directed extensions 82a, 84a having triangular shapes which act as belt guides to prevent the dryer belt from locating between an arm 82, 84 and the pulley 64 during installation of the assembly 60. These extensions can also be stamp-formed integrally with the bracket 66. A shaft 90 having a generally C-shaped cross section is provided spanning between the arms 82, 84 and tightly fit within D-shaped apertures 92 of the arms 82, 84 (as shown in FIG. 5). The idler pulley 64 provides a central journal 96 which is threaded by the shaft 90. As shown in FIG. 3, the pulley 64 further provides a belt receiving circumferential surface 64a for receiving the belt 54. The journal 96 rotates on the shaft 90. The shaft 90 is formed by a rolled steel plate, into an approximate C-shape, in particular, a D-shape missing a center portion of the upright stem of the "D". The surface of the shaft is polished to a smooth finish. Within the C-shaped shaft is inserted an elongate wick 100, formed of felt, foam or similar material, and having an approximate triangular cross section with a rounded leg 102 ("pie-shaped"). The rounded leg 102 fits closely within the C-shaped cross section of the shaft and the opposite apex 104 protrudes outwardly through an open area of the shaft to press against an inside bearing surface of the journal 96. The wick 100 is oil impregnated, such oil impregnation to last the effective lifetime of the dryer 10.

Figure 4:
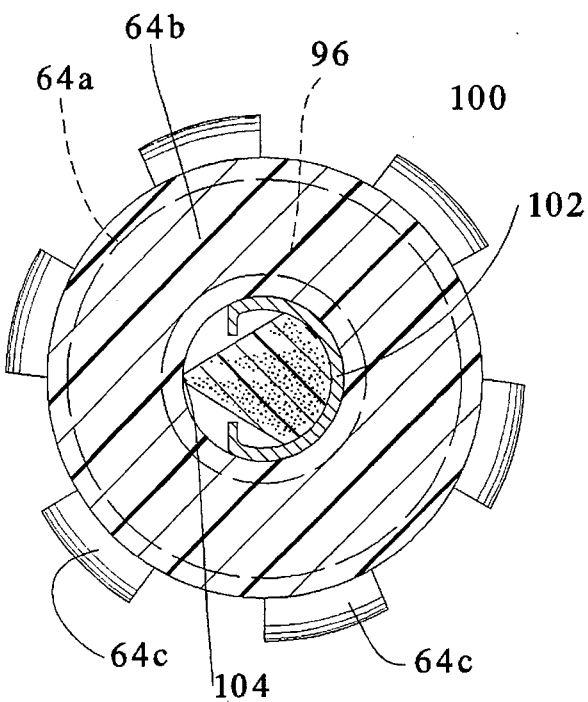
FIG. 4 is a sectional view taken generally through line IV—IV of FIG. 3.

As shown in FIG. 4, a radially extending disk 64b connects the journal 96 to the circumferential belt receiving surface 64a. As shown in FIGS. 3 and 4, extending from the surface 64a are segmental, circumferentially spaced belt guiding tabs which are staggered across a width of the pulley 64 with tabs 64c on opposite sides of the belt guiding surface 64a. This staggered arrangement allows for easy molding of the pulley using a single axis mold pull, which reduces manufacturing costs.

Figure 6:
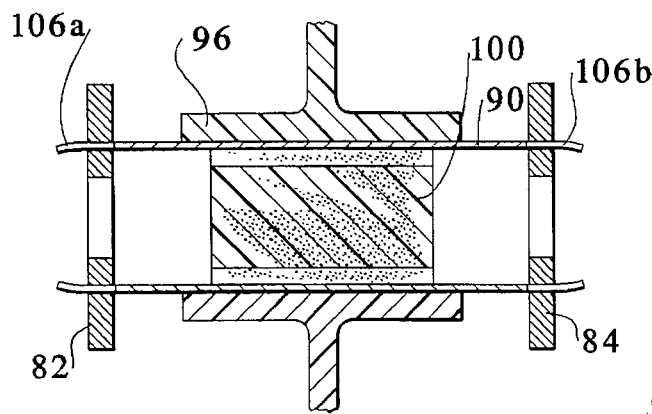
FIG. 6 is a sectional view taken generally along line VI—VI from FIG. 5.
Figure 7:
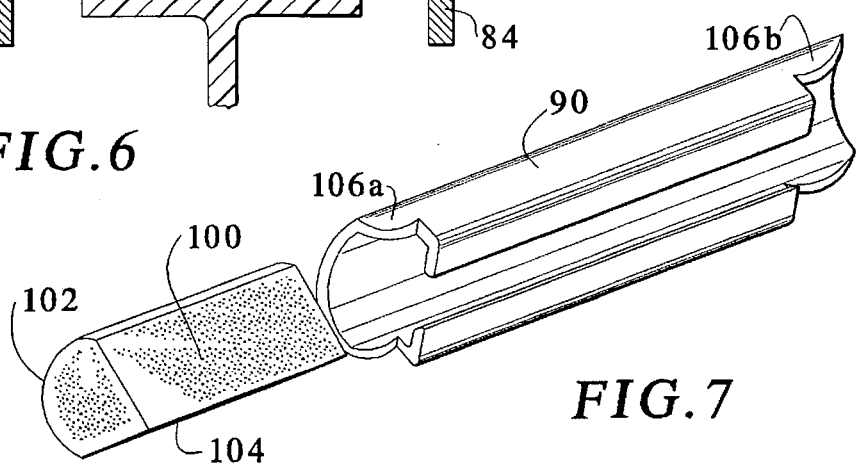
FIG. 7 is an exploded perspective view of the shaft and wick shown in FIG. 4.

As shown in FIGS. 5–7, the shaft 90 comprises C-shaped extensions 106a,b on opposite axial ends of the shaft. The C-shaped extensions 106a,b fit tightly within the D-shaped apertures 92 at the arms 82, 84.

As understood from the drawings and descriptions thereof, the idler assembly 60 can be assembled into the dryer without screw fasteners which provides an assembly time savings. The assembly 60 is installed to the belt 54 with reduced chance of misalignment of the belt to the pulley 64 due to the extensions 82a, 84a. A reduced assembly cost can be realized. The shaft and wick arrangement provide for long, useful life of the assembly 60 and provides for smoother and quieter operation.

Although the present invention has been described with reference to a specific embodiment, those of skill in the art will recognize that changes may be made thereto without departing from the scope and spirit of the invention as set forth in the appended claims.

We claim as our invention:

1. A clothes dryer, comprising:

a drum for receiving clothes and mounted for rotation about its axis;

a motor having a drive pulley extending therefrom, said motor rotating said drive pulley;

a belt wrapped around said drum and said drive pulley;

an idler pulley assembly, having an idler pulley with a belt guiding surface thereon, and a shaft, said shaft having a concave cross section, said idler pulley rotatable on said shaft and pressed to said belt on said belt guiding surface, means for resiliently pressing said belt guiding surface to said belt, a bracket means for holding said shaft, and an oil impregnated wick arranged partially within said concave cross section of said Shaft and protruding radially therefrom to deposit oil between said pulley and said shaft.

2. A clothes dryer, comprising:

a drum for receiving clothes and mounted for rotation about its axis;

a motor having a drive pulley extending therefrom, said motor rotating said drive pulley;

a belt wrapped around said drum and said drive pulley;

an idler pulley assembly, having an idler pulley with a belt guiding surface thereon, and a shaft, said idler pulley rotatable on said shaft and pressed to said belt on said belt guiding surface, means for resiliently pressing said belt guiding surface to said belt, a bracket means for holding said shaft, and an oil impregnated wick arranged to deposit oil between said pulley and said shaft, wherein said bracket means comprises two arms for journaling said shaft on opposite sides of said pulley and said shaft comprises an open cross section, said shaft receiving said wick partially therein and said wick extending out through said open cross section to press against an inside surface of said pulley.

3. The clothes dryer according to claim 2, wherein said shaft is connected to said arms by having C-shaped projections at opposite ends of said shaft to be captured in D-shaped apertures located in said arms.

4. The clothes dryer according to claim 1, comprising a dryer cabinet having a base below said drum and wherein said means for resiliently pressing said belt guiding surface comprises a spring support mounted to said base of said dryer cabinet and deflected by contact pressure between said belt and said belt guiding surface.

5. The clothes dryer according to claim 4, wherein said spring support comprises a generally V-shaped spring steel member having a base portion having formations thereon to engage said base of said dryer and a lever portion extending upward from said base portion to said bracket means.

6. The clothes dryer according to claim 4, wherein said bracket means and said spring support are stamped-formed integrally of a spring steel material.

7. The clothes dryer according to claim 1, wherein said idler pulley comprises belt guiding tabs arranged segmentally in circumferentially spaced apart fashion on opposite sides of said belt guiding surface, said tabs staggered across a width of said belt guiding surface.

8. The clothes dryer according to claim 1, wherein said shaft is C-shaped in cross section and said wick inserted therein is approximately triangular in cross section.

9. An idler pulley assembly for a belt driven appliance, the appliance having a drive pulley, a driven member, and a belt wrapped around said driven member and said drive pulley, comprising:

an idler pulley with a belt guiding surface thereon, and a shaft, said shaft having an open cross section, said idler pulley rotatable on said shaft;

a bracket means for rotatably holding said shaft;

an oil impregnated wick arranged partially within said open cross section of said shaft and protruding radially therefrom to deposit oil between said idler pulley and said shaft; and means for resiliently pressing said belt guiding surface against said belt.

10. An idler pulley assembly for a belt driven appliance, the appliance having a drive pulley, a driven member, and a belt wrapped around said driven member and said drive pulley, comprising:

an idler pulley with a belt guiding surface thereon, and a shaft, said idler pulley rotatable on said shaft;

a bracket means for rotatably holding said shaft;

an oil impregnated wick arranged to deposit oil between said idler pulley and said shaft; and means for resiliently pressing said belt guiding surface against said belt wherein said bracket means comprises two arms for journaling said shaft on opposite sides of said pulley and said shaft comprises an open cross section, said shaft receiving said wick partially therein and said wick extending out through said open cross section to press against an inside surface of said pulley.

11. The idler pulley assembly for a belt driven appliance according to claim 10, wherein said shaft is connected to said arms by having C-shaped projections at opposite ends of said shaft captured in D-shaped apertures located in said arms.

12. The idler pulley assembly according to claim 10, further comprising a first and a second extension each mounted to one of said two arms and extending inwardly toward each other for preventing said belt from locating between one of said two arms and said idler pulley.

13. The idler pulley assembly for a belt driven appliance according to claim 9, comprising a stationary base beneath the idler pulley, and wherein said means for resiliently pressing said belt guiding surface comprises a spring support mounted to said base and deflected by contact pressure between said belt and said belt guiding surface.

14. The idler pulley assembly for a belt driven appliance according to claim 13, wherein said spring support comprises a generally V-shaped spring steel member having a base portion having formations thereon to engage said base of said dryer and a lever portion extending upward from said base portion to said bracket means.

15. The idler pulley assembly for a belt driven appliance according to claim 13, wherein said bracket means and said spring support are stamped-formed integrally of a spring steel material.

16. The idler pulley assembly for a belt driven appliance according to claim 9, wherein said idler pulley comprises belt guiding tabs arranged segmentally in circumferentially spaced apart fashion on opposite sides of said belt guiding surface, said tabs staggered across a width of said belt guiding surface.

17. The idler pulley assembly for a belt driven appliance according to claim 9, wherein said shaft is C-shaped in cross section and said wick inserted therein is approximately triangular in cross section.

18. An idler pulley assembly for a belt driven appliance, the appliance having a drive pulley, a driven member, and a belt wrapped around said driven member and said drive pulley, comprising:

an idler pulley with a belt guiding surface thereon, and a shaft, said idler pulley rotatable on said shaft;

a bracket means for rotatably holding said shaft, including two arms for journaling said shaft on opposite sides of said pulley;

a spring support mounted to a base member and connected to said bracket means and deflected by contact pressure between said belt and said belt guiding surface, said spring support including a generally V-shaped member having a base portion having formations thereon to engage said base member and a lever portion extending upward from said base portion to said bracket means; and a first and a second extension each mounted to one of said two arms and extending inwardly toward each other for preventing said belt from locating between one of said two arms and said idler pulley.

19. The idler pulley assembly for a belt driven appliance according to claim 18, wherein said idler pulley comprises belt guiding tabs arranged segmentally in circumferentially spaced apart fashion on opposite sides of said belt guiding surface, said tabs staggered across a width of said belt guiding surface.

20. The idler pulley assembly for a belt driven appliance according to claim 18, wherein said shaft comprises an open cross section, said shaft receiving a wick partially therein and said wick extending out through said open cross section to press against an inside surface of said pulley.

21. The idler pulley assembly for a belt driven appliance according to claim 20, wherein said shaft is C-shaped in cross section and said wick inserted therein is approximately triangular in cross section.

* * * * *